US006728511B2

(12) United States Patent
Watanabe

(10) Patent No.: US 6,728,511 B2
(45) Date of Patent: Apr. 27, 2004

(54) IMAGE FORMING APPARATUS

(75) Inventor: Yoshiaki Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/907,592

(22) Filed: Jul. 19, 2001

(65) Prior Publication Data

US 2002/0015604 A1 Feb. 7, 2002

(30) Foreign Application Priority Data

Jul. 21, 2000 (JP) ....................................... 2000-221310

(51) Int. Cl.[7] ......................... G03G 15/00; H04N 01/04
(52) U.S. Cl. ....................................... 399/405; 399/107
(58) Field of Search ................................ 399/405, 107, 399/211

(56) References Cited

U.S. PATENT DOCUMENTS 5,839,025 A * 11/1998 Okauchi et al. .............. 399/92
5,920,758 A * 7/1999 Ohtsuki ...................... 399/405

FOREIGN PATENT DOCUMENTS

| | | |
|---|---|---|
| JP | 5-197225 | 8/1993 |
| JP | 8-340414 | 12/1996 |
| JP | 2688458 | 8/1997 |
| JP | 11-84797 | 3/1999 |

* cited by examiner

*Primary Examiner*—Quana M. Grainger
(74) *Attorney, Agent, or Firm*—Fitzpatrick, Cella, Harper & Scinto

(57) ABSTRACT

An image forming apparatus includes a space portion for stacking sheets thereon, and is constituted of an image forming portion and an image reading portion including first and second scanning optical systems therein. In the image forming apparatus, the image reading portion is loaded on three points that correspond to both corners on the scanning start position side and one corner on the apparatus rear side. This configuration allows the first and second scanning optical systems to compensate for each other's misalignment, thereby obtaining stable output images.

22 Claims, 15 Drawing Sheets

IMAGE FORMING APPARATUS

BACKGROUND OF THE INVENTION

1. Field of the Invention

The present invention relates to an image forming apparatus having an image reading portion and an image forming portion.

2. Related Background Art

There is a conventional image forming apparatus which provides space between an image reading portion and an image forming portion for stacking sheets with images formed thereon. FIG. 8 shows an example of the conventional apparatus. Such an apparatus does not need a tray for stacking sheets with images formed thereon to be provided on the side of the apparatus, which has the advantage of reducing the space the apparatus occupies.

In FIG. 8, an apparatus main body A' of an image forming apparatus 2200 is provided with an image reading portion B' on the upper side and an image forming portion C' on the lower side. The image reading portion B' functions as image reading means for reading image information of a book original, while the image forming portion C' functions as image forming means. A sheet deck D' is attached underneath the image forming portion C' so that the image forming portion C' and the sheet deck D' will constitute an image forming section.

The image reading portion B' is constituted of a scanning system light source 2201, a platen glass plate 2202, an original pressure plate 2203 capable of opening and closing a scanning main body E', a mirror 2204, a lens 2205, a light receiving element (photoelectric element) 2206, an image processing portion and so on.

Sheets with toner images formed thereon by the image forming portion C' are stacked on a delivery portion 2120 arranged inside the apparatus (this type of delivery method is referred to below as in-body delivery).

For the in-body delivery system, some frame structures are known to provide a space between the image reading portion and the image forming portion. For example, Japanese patent application laid-open No. 5-197225 describes an image forming apparatus (see FIG. 9) in which the image reading portion is supported at two corners (301, 302) on the rear side of a sheet removing portion 300. Japanese patent No. 2685458 describes an image forming apparatus (see FIG. 10) in which the image reading portion is supported at two corners (401, 402) on the diagonal line with respect to the top of the image forming portion. Japanese patent application laid-open No. 8-340414 describes an image forming apparatus (see FIG. 11) in which a scanner part is supported at four corners (501, 502, 503, 504) on the top of a printer part.

The above-mentioned frame structures, however, have respective drawbacks. For example, the apparatus (FIG. 9) described in Japanese patent application laid-open No. 5-197225 is such that columns are provided in two positions (at two corners) alone. Therefore, when the pressure plate and the like of the image reading portion is strongly pressed from above against a thick book or the like as an original, the columns supporting the image reading portion may be deformed plastically. On the other hand, the apparatus (FIG. 11) described in Japanese patent application laid-open No. 8-340414 is restricted to removing sheets only from the front side. Therefore, when printing on A3 sheets or longer or when removing narrower sheets from the in-body delivery portion, an operator has to stoop over his or her work, which puts a load on the operator.

To solve the above-mentioned problems, there is still another type of apparatus 600 as shown in FIG. 12. The apparatus 600 provides a space only in the front left-hand corner 601 of the apparatus, which makes them possible to prevent plastic deformation of the columns and increase the removability of paper.

The apparatus of FIG. 12 is such that the frame of the original reading portion and built-in components of the frame, namely a first mirror unit (first scanning optical system) 631 and second mirror units (second scanning optical systems) 632 and 633, are supported on three points. In other words, only three columns provided at three corners of the frame support the frame and the built-in components. Therefore, when pushed down from above, the frame is distorted or deformed as shown in FIG. 12 from the solid-line position to the dot and dash line position, which in turn makes it easy to deform rail planes that essentially lead the optical systems into operation in accordance with the deformation. As a result, as shown in FIG. 13A, an optical path (which assumes end points c and d) indicated by the dot and dash line is formed on the rear side of the mirror units, while an optical path (which assumes end points a and b) indicated by the solid line is formed on the front side. FIG. 13B illustrates both optical paths three-dimensionally.

If the optical paths, which are expected to be essentially parallel with each other, are mutually twisted, a right-angled aberration (distortion) occurs to an output image (FIG. 14B), compared to an ideal output image (FIG. 14A). This makes it difficult to sufficiently ensure the accuracy of image formation.

SUMMARY OF THE INVENTION

It is an object of the present invention to prevent optical paths from being distorted in an image forming apparatus even if an image reading portion is deflected, the image reading portion being provided separately from an image forming portion so that recording media will be delivered between the image reading portion and the image forming portion.

It is another object of the present invention to provide an image forming apparatus comprising: a reader portion for reading an original image, the reader portion including an original placement stand on which an original is placed and a scanning unit for scanning the original on the original placement stand from a predetermined home position at which the scanning unit is at rest during each non-scan period; an image forming portion for forming an image on a recording sheet according to an image signal; and a delivery portion provided between the reader portion and the image forming portion for delivering the recording sheet with the image formed thereon by the image forming portion, wherein the reader portion is supported by the image forming portion in the general shape of a letter “L” at least on the home position side and the rear side of the apparatus.

Other objects of the present invention will become apparent from the following description of an embodiment with reference to the accompanying drawings.

DESCRIPTION OF THE PREFERRED EMBODIMENTS (First Embodiment)

Referring now to the accompanying drawings, a description will be made about a copying machine to which the first embodiment of the present invention is applied.

Figure 1:
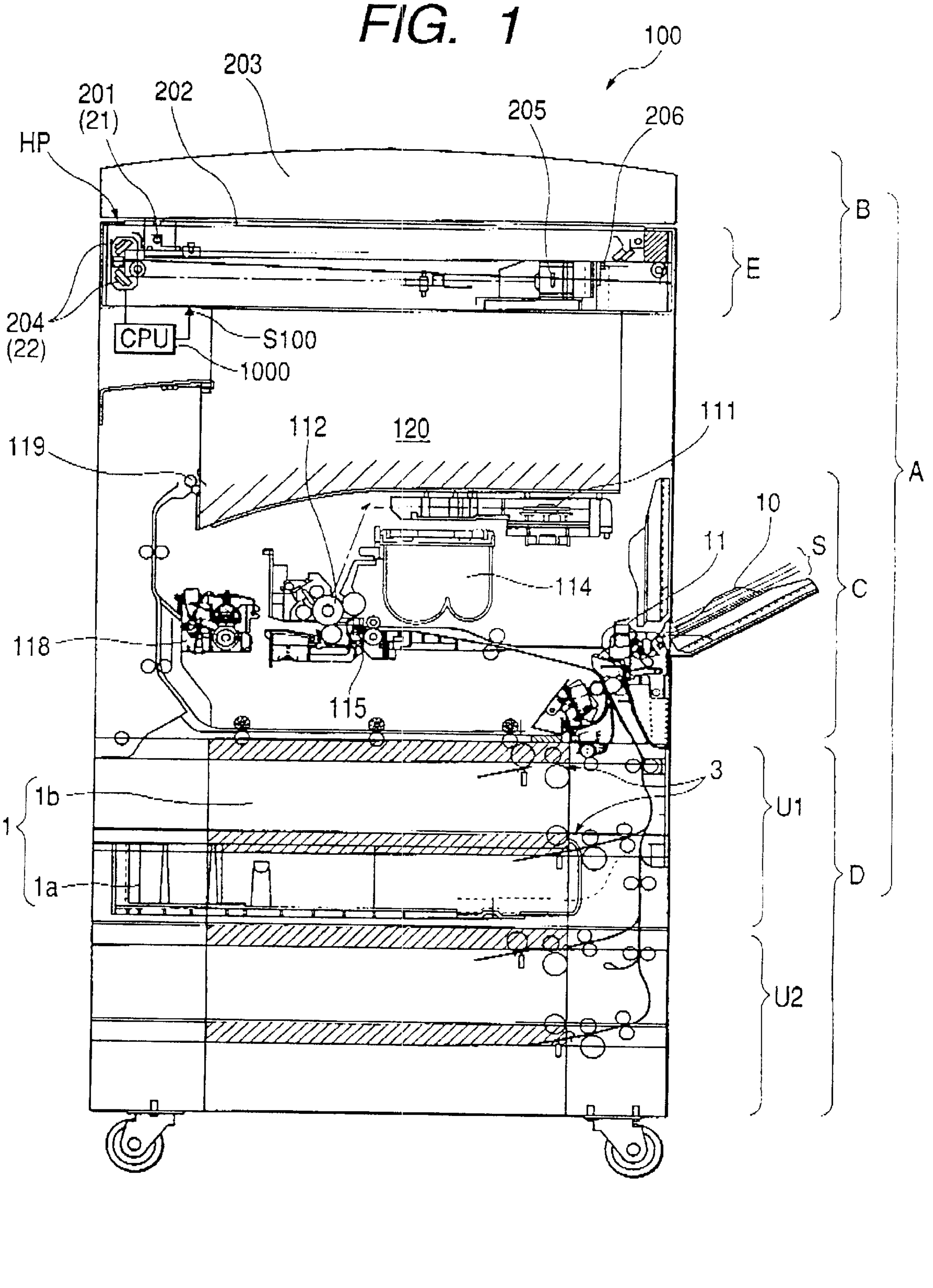
FIG. 1 is a side sectional view schematically showing the arrangement of main components in an image forming apparatus according to a first embodiment of the present invention.

FIG. 1 is a side sectional view schematically showing the internal arrangement of the copying machine according to the first embodiment of the present invention.

A copying machine 100 is constituted of: a main body A; an image reading portion B, which is provided on the upper side as part of the main body A and functions as image reading means for reading image information from a book original; an image forming portion C provided below the image reading portion B and functioning as image forming means; and a sheet deck D attached to the lower side of the image forming portion C.

As shown in FIG. 1, the image reading portion B includes a scanning system light source 201, a platen glass plate 202, an original pressure plate 203 capable of opening and closing a scanning body E, a mirror 204, a lens 205, a light receiving element (photoelectric element) 206, an image processing portion and so on. In operation, a book or sheet-shaped original, such as a book, a thick sheet of paper or a curled sheet of paper, is placed on the platen glass plate 202 with its image bearing surface facing downward, and set at rest by an operator pressing the original pressure plate 203 against the back side of the original.

Figure 2:
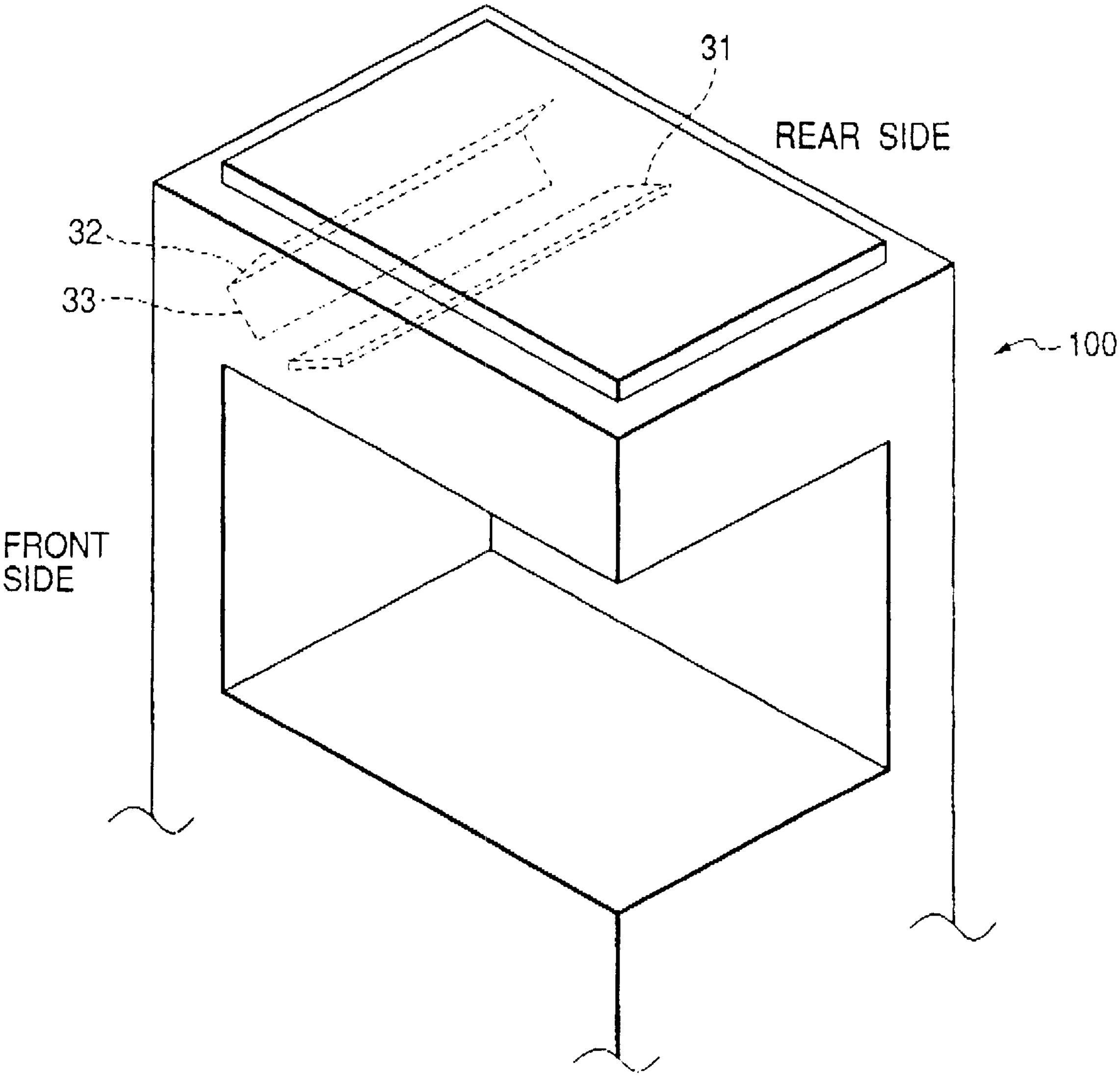
FIG. 2 is a perspective view schematically showing the arrangement of first and second optical systems in the image forming apparatus according to the first embodiment of the present invention.
Figure 3:
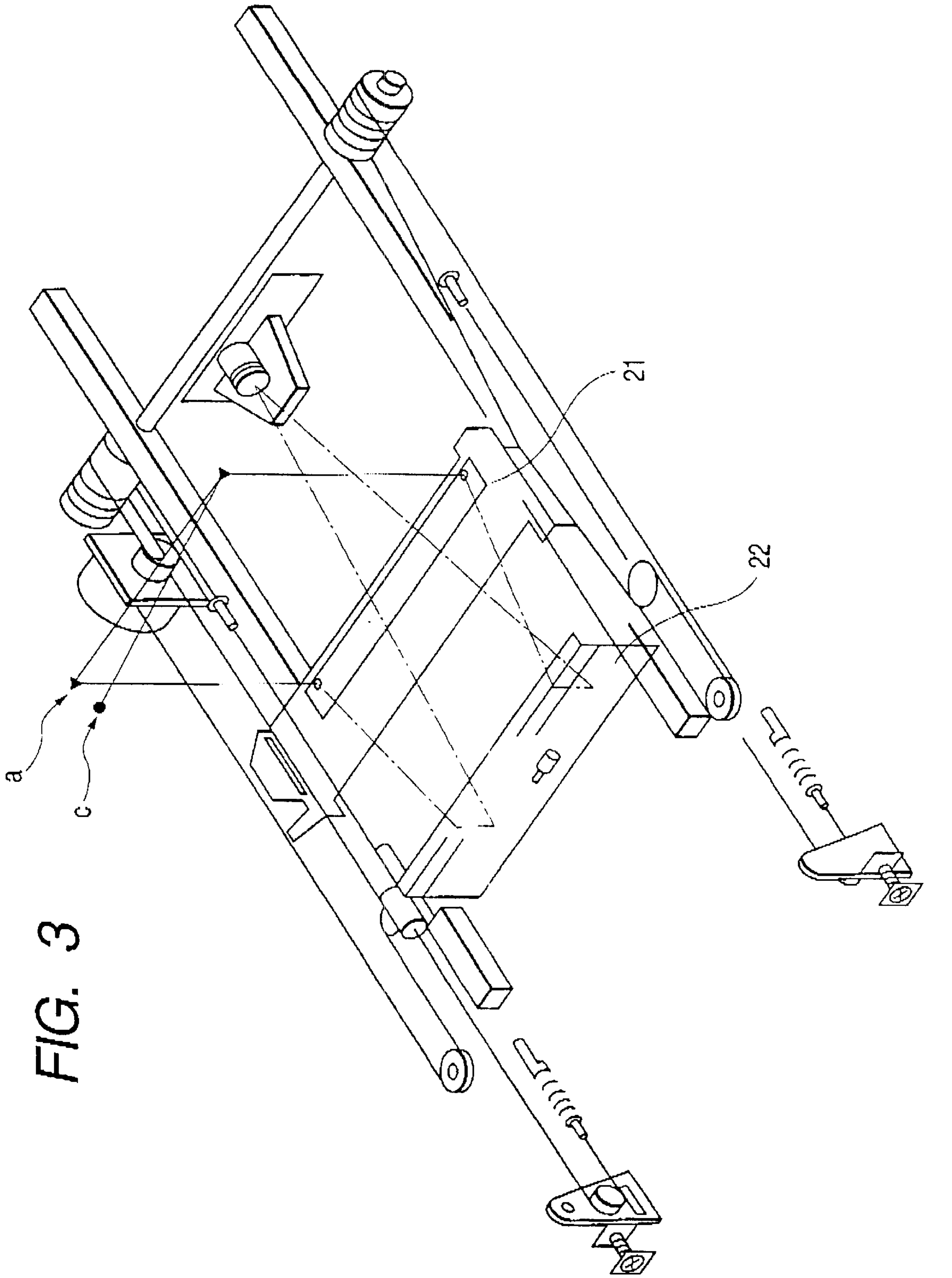
FIG. 3 is a perspective view for explaining optical paths formed in an image reading portion that is part of a copying machine according to the first embodiment of the present invention.

As shown in FIGS. 2 and 3, the image reading portion B has a first scanning optical system 21 for scanning a full-page area of the original, and a second scanning optical system 22 for scanning half the area the first scanning optical system 21 scans. In operation, original-side data is read through optical paths by a CCD unit in which the lens 205 and the light receiving element (CCD chip) 206 are incorporated. The optical paths follow third and second mirrors 33, 32 provided in the second scanning optical system 22 (second mirror unit), and a first mirror 31 provided in the first scanning optical system 21 (first mirror unit), respectively. Image information on the original sensed by the light receiving element 206 is processed in the image processing portion, and converted into an electrical signal, and transmitted to a laser scanner 111.

There is a home position HP for the first and second scanning optical systems 21 and 22 on the left side of the image reading portion B as shown in FIG. 1.

It should be noted that the image forming apparatus main body A functions as a copying machine when the signal processed by the image processing portion is input to the laser scanner 111, while it functions as a printer when an input signal from a computer is entered.

The image forming apparatus main body A also functions as a facsimile when it receives a signal from another facsimile or it is to send another facsimile the signal processed by the image processing portion.

On the other hand, a sheet cassette unit 1 is mounted below the image forming portion C. The sheet cassette unit 1 is constituted of a lower cassette 1*a* and an upper cassette 1*b* as one feed unit. In this example, the apparatus has two feed units U1 and U2, that is, four cassettes are mounted in total.

The upper feed unit U1 is removably attached to the apparatus main body A, while the lower feed unit U2 is removably attached to the sheet deck D.

In operation, sheets held in the cassettes 1*a* and 1*b* are drawn out, separated and fed one by one by pickup rollers 3 as feed rotary members to be described later. Then each of the sheets is transported by transport rollers to registration rollers by which the sheet is fed to the image forming portion C in synchronism with the process of image formation.

In addition to the above-mentioned sheet cassettes 1, a manual sheet feed tray 10 is arranged at the side of the apparatus main body A. At manual feeding, each of sheets S on the tray 10 is drawn out and fed by a manual sheet feed roller 11 to the registration rollers. The image forming portion C includes an electrophotographic photosensitive drum 112, the laser scanner (image writing optical system) 111, a developing device 114 and a transfer charger 115.

In operation, the surface of the photosensitive drum 112 is uniformly charged by a charger, and a laser beam corresponding to the image information is emitted from a laser light source, and scanned by the laser scanner (image writing optical system) 111 to form a latent image. The latent image is formed into a toner image by the developing device 114, and the toner image is transferred by the transfer charger 115 onto the first side of a sheet transported by the registration rollers in synchronism with the rotation of the photosensitive drum 112.

The image forming portion C also includes a fixing device 118 and a delivery roller 119. The sheet on which the toner image has been formed is transported to the fixing device

118 in which the toner image is fixed into place on the surface of the sheet by the application of heat and pressure. After that, the sheet is stacked on a delivery portion 120 arranged inside the apparatus by a delivery roller 119.

Figure 4A:
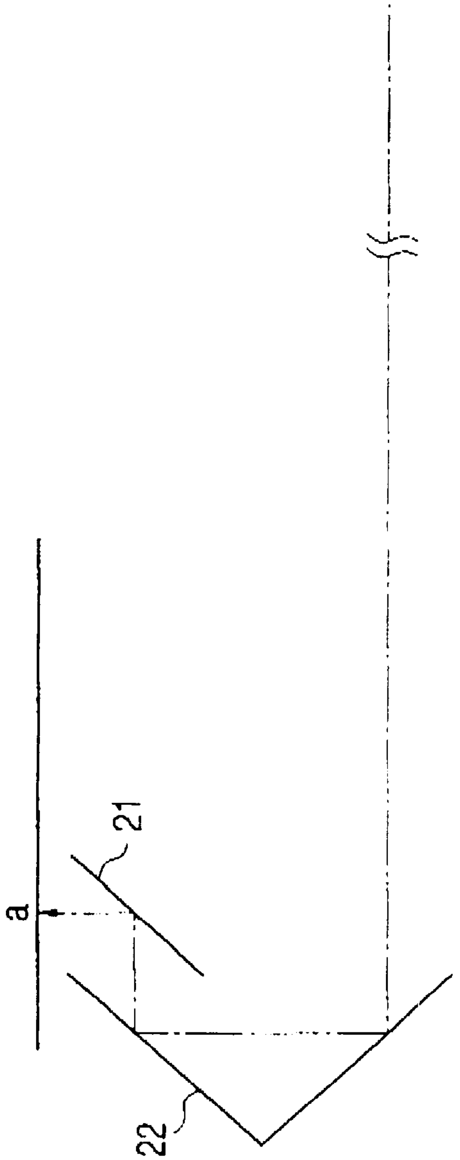
FIGS. 4A and 4B are schematic diagrams illustrating ideal optical paths to be formed in the image forming apparatus according to the first embodiment of the present invention.
Figure 4B:
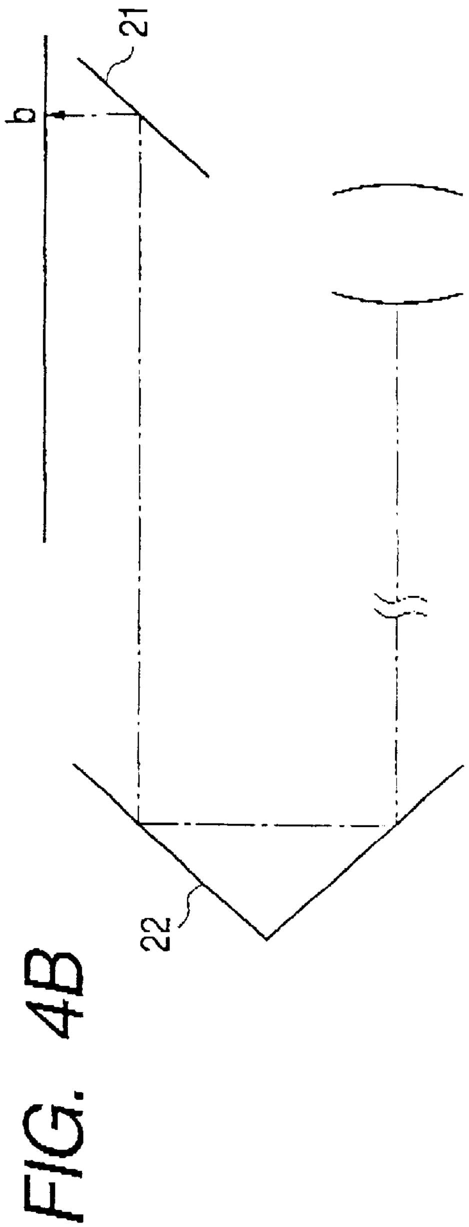

Ideal optical paths in the above-mentioned arrangement are shown in FIGS. 4A and 4B. When the first scanning optical system 21 moves close to the second scanning optical system 22, an optical path as shown in FIG. 4A is formed, while when the first scanning optical system 21 moves away from the second scanning optical system 22, an optical path as shown in FIG. 4B is formed.

As described with respect to the related art, the operator often leans on the top of the image forming apparatus to press the same.

Figure 5:
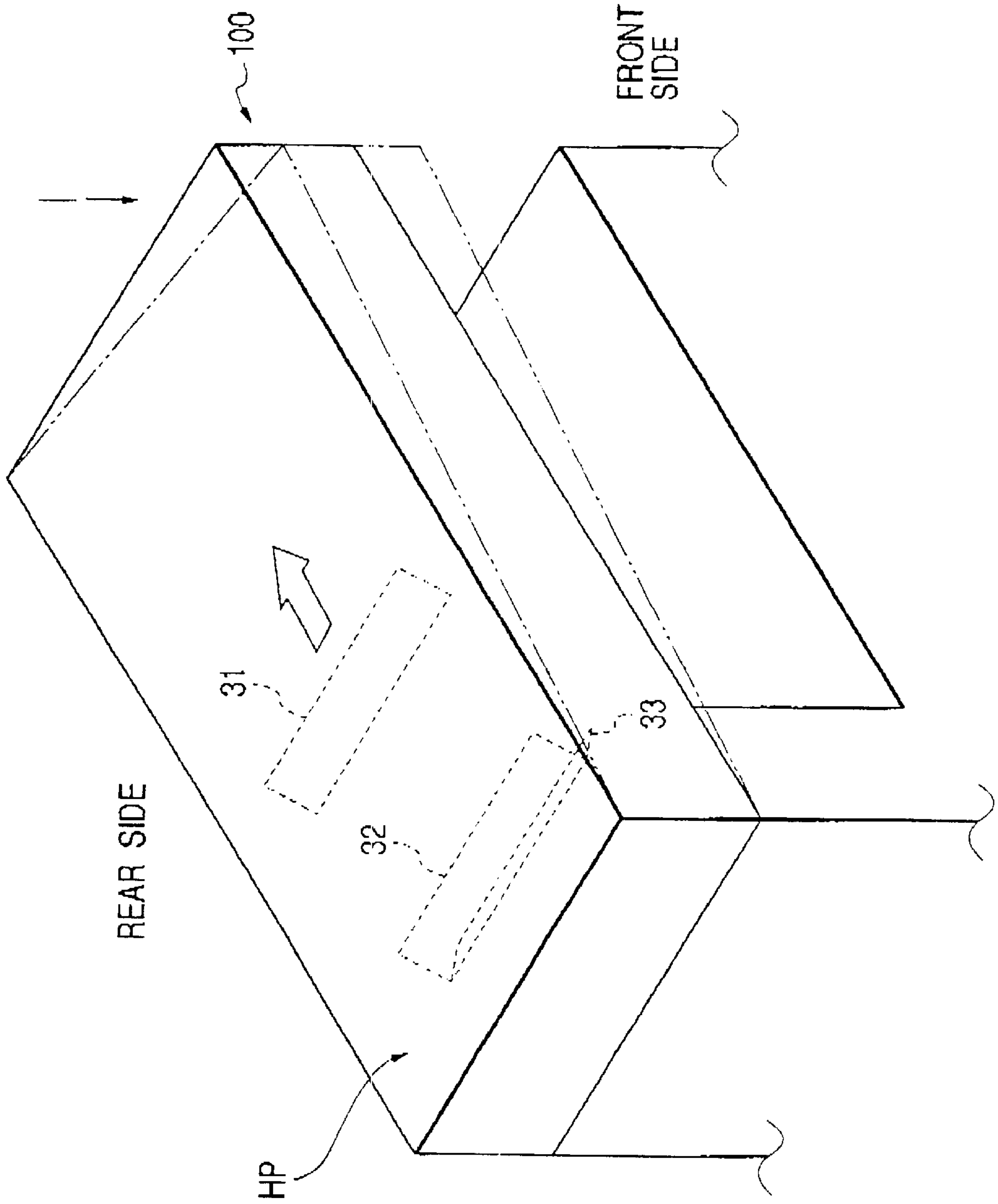
FIG. 5 is a perspective view schematically showing what deformation will occur in the frame if a force is applied from above to the image reading portion that is part of the image forming apparatus according to the first embodiment of the present invention.

In this case, if the image reading portion B has such a frame structure that a space is provided in one of four corners, the frame could be deformed as shown in FIG. 5 as seen from the upper side.

In other words, when high pressure is applied onto the original pressure plate 203 (see FIG. 1), for example, it is brought into contact with and rubbed against the first and second mirror units. As a result, rail members (not shown) linearly provided along the horizontal direction as tracks for moving the respective mirror units could be deformed slightly. To be more specific, the rail member on the rear side is seldom deformed, but the rail member on the front side is deformed only slightly near the home position HP. Further, the scanner frame is greatly bent in the hollow portion. Consequently, as shown in FIGS. 6A and 6B, an optical path indicated by the solid line is formed on the rear side, while an optical path indicated by the dot-dash line is formed on the front side.

As the first and second mirror units approach the home position, both mirror units move closer to each other. Under the circumstances, the optical path as shown in FIG. 6A is formed.

On the other hand, as the first and second mirror units leave the scanning start position (home position), both mirror units go away from each other. Under the circumstances, the optical path as shown in FIG. 6B is formed.

Figure 6A:
FIGS. 6A and 6B are schematic diagrams illustrating optical paths formed inside the image forming apparatus according to the first embodiment of the present invention.
Figure 6B:
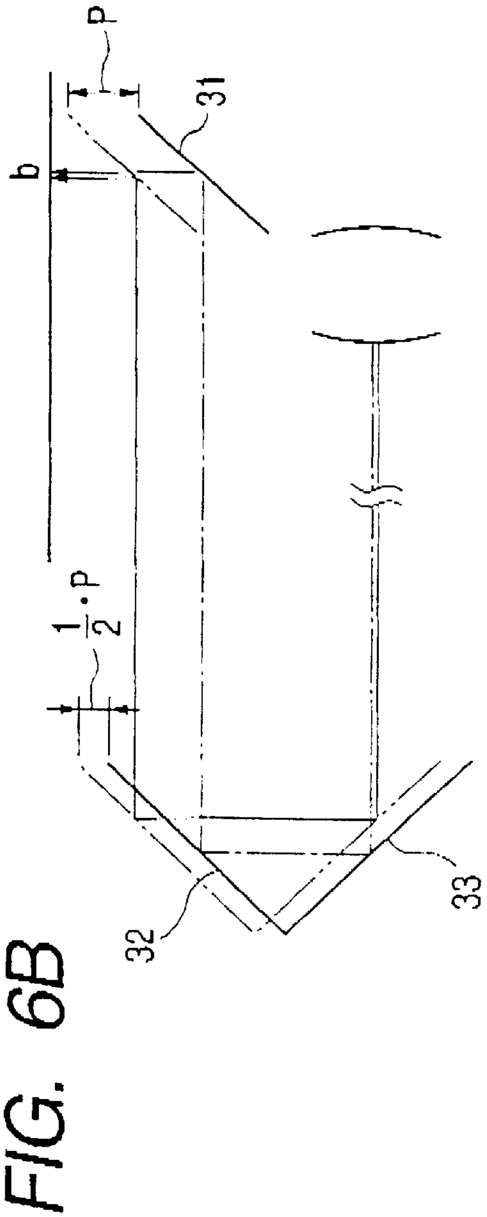

In other words, as shown in FIG. 6A, when both mirror units are relatively close to the home position, they are in positions where the main body (frame) of the image reading portion B can be less distorted. Therefore, even if the image forming apparatus is pressed from the outside (from above), the optical path formed will be nearly ideal.

Figure 14A:
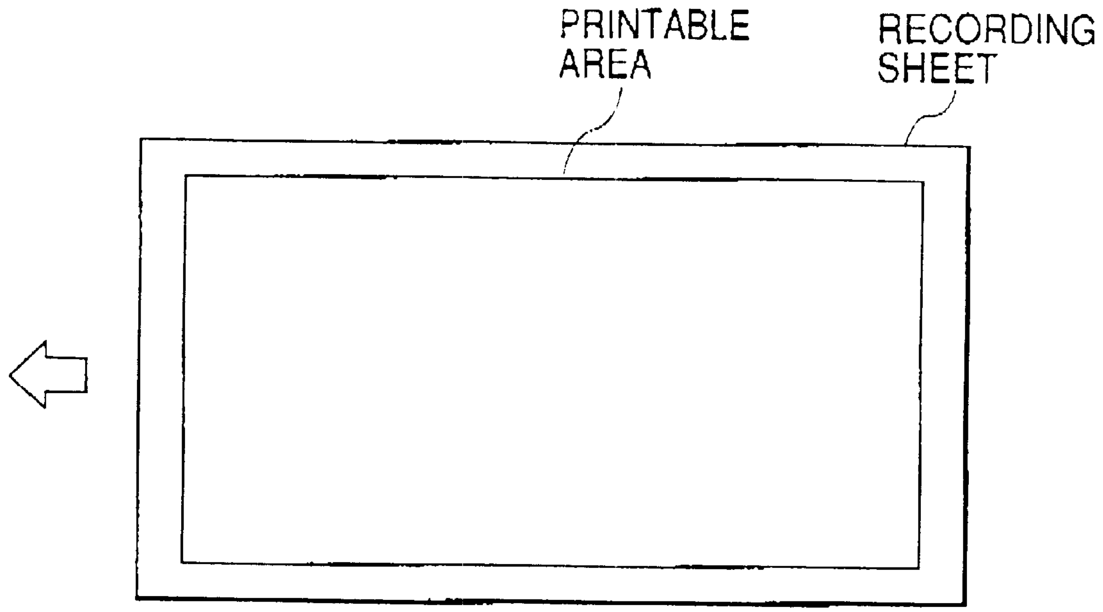
FIGS. 14A and 14B are plan views showing printable areas.
Figure 14B:
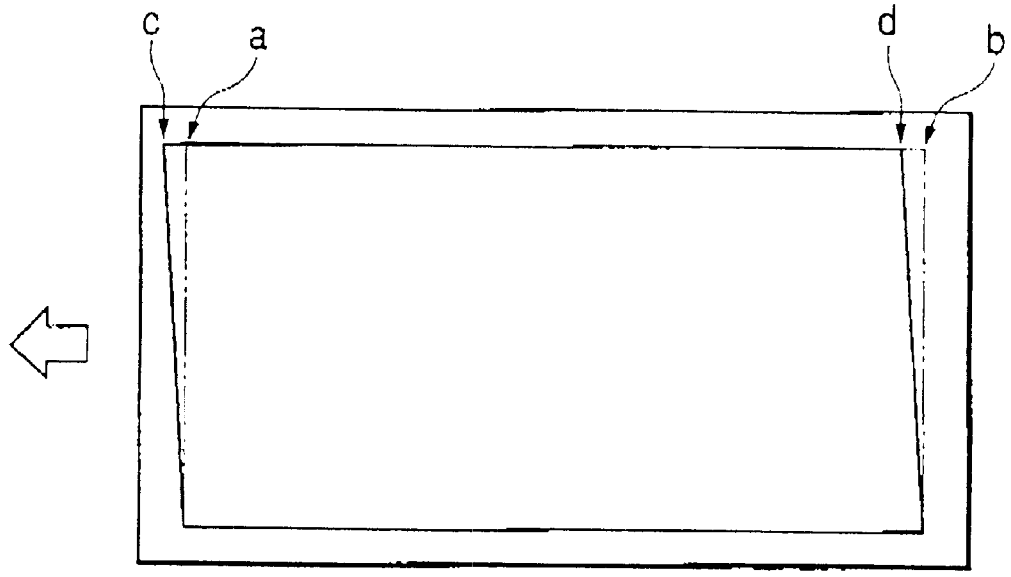

On the other hand, as shown in FIG. 6B, when both mirror units are relatively far away from the home position, the first mirror unit is in a position where the main body (frame) of the image reading portion B can be more distorted. If the amount of deviation from perfect alignment of the first mirror unit is P, the amount of deviation of the second mirror unit becomes P/2. In this case, though the optical path is not ideal as shown in FIG. 6B, the original reading position becomes equivalent to that of the ideal optical paths, thereby obtaining a proper image, for example, as shown in FIG. 14A.

The image forming apparatus is provided with the first scanning optical system that reciprocates along one direction along the surface of the original to scan reflected light from the original. The image forming apparatus is also provided with the second scanning optical system that moves along the same direction for about half the distance traveled by the first scanning optical system in synchronism with the reciprocating movement of the first scanning optical system. Further, the image forming apparatus has the optical system for guiding the reflected light from the original placed within the scanning range of the first scanning optical system. The reflected light finally reaches the reading means through the first and second scanning optical systems. The image reading portion including the above-mentioned optical systems is supported at least on two points on the scanning start side, and one point in the traveling direction of the scanning optical systems. Therefore, even if the image reading portion is deflected or inclined, little effect on the resultant image is produced.

In addition to the first and second scanning optical systems, the optical system further has other parts. The parts include members for putting each optical system on track to maintain the stopping position of each optical system, the position of the optical system relative to another under operating conditions, and proper attitude and arrangement of the optical system, members constituting the frame, and so on.

According to the above-mentioned structure, even if the optical rail plane is distorted by the application of pressure to the optical systems (frame) supported above the hollow portion in the direction of their own weight, the optical paths decided by the arrangement of the first and second scanning optical systems do not vary in real terms, thus keeping ideal loci (ideal optical paths).

In other words, since the optical systems are placed in position in the frame, the first and second scanning optical systems compensate for each other's misalignment, thereby obtaining an ideal (stable) output image, i.e., maintaining the operational reliability of image formation.

It should be noted that the scanning optical systems can be supported by either or both of columns and walls to compensate for each other's misalignment as long as the image reading portion is supported at least on three points composed of both corners on the scanning start position side of the scanning optical systems and one corner on the apparatus rear side. Greater use of columns expands space to make stacked sheets easy to handle, while walls are sturdier.

The image forming apparatus may be such that the scanning start point of the scanning optical systems is set on the left side and the opening portion for in-body delivery is provided over the front and right sides. In this case, the image forming apparatus can provide ease of use in countries or locations where the majority of people or operators are right-handers who usually remove sheets from the right side.

(Second Embodiment)

A description will be made next about the second embodiment, concentrating on points different from the first embodiment.

Figure 7:
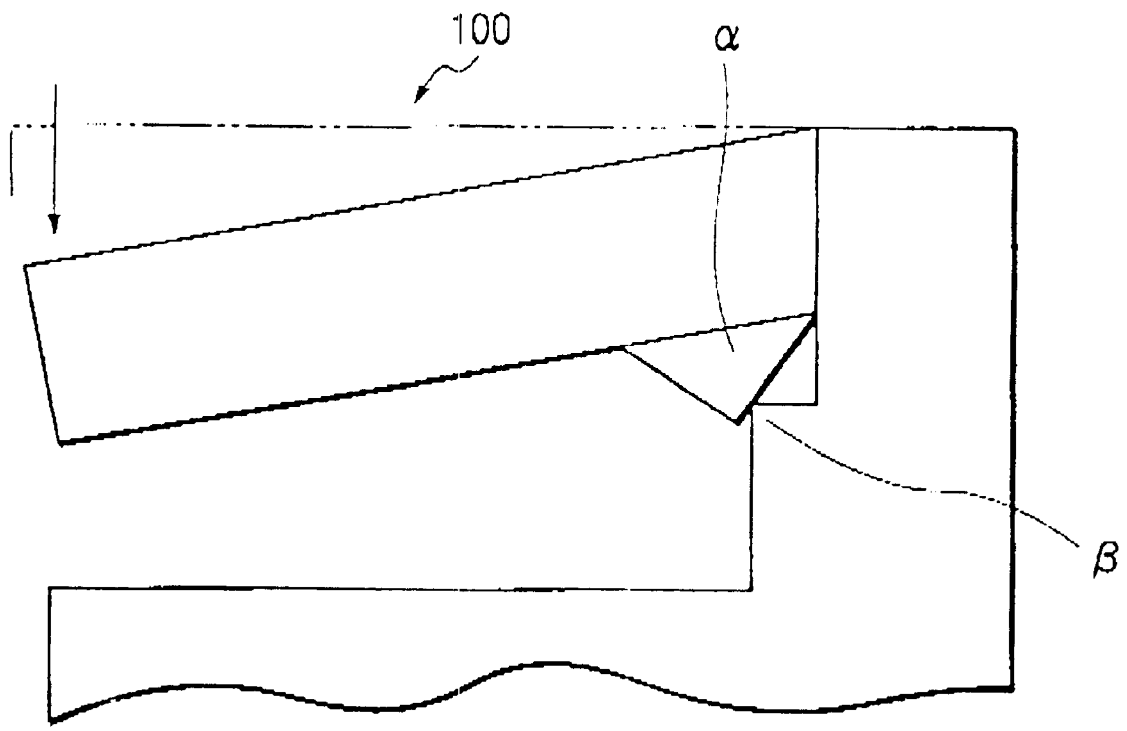
FIG. 7 is a side view schematically showing a main configuration of an image forming apparatus according to a second embodiment of the present invention.
Figure 8:
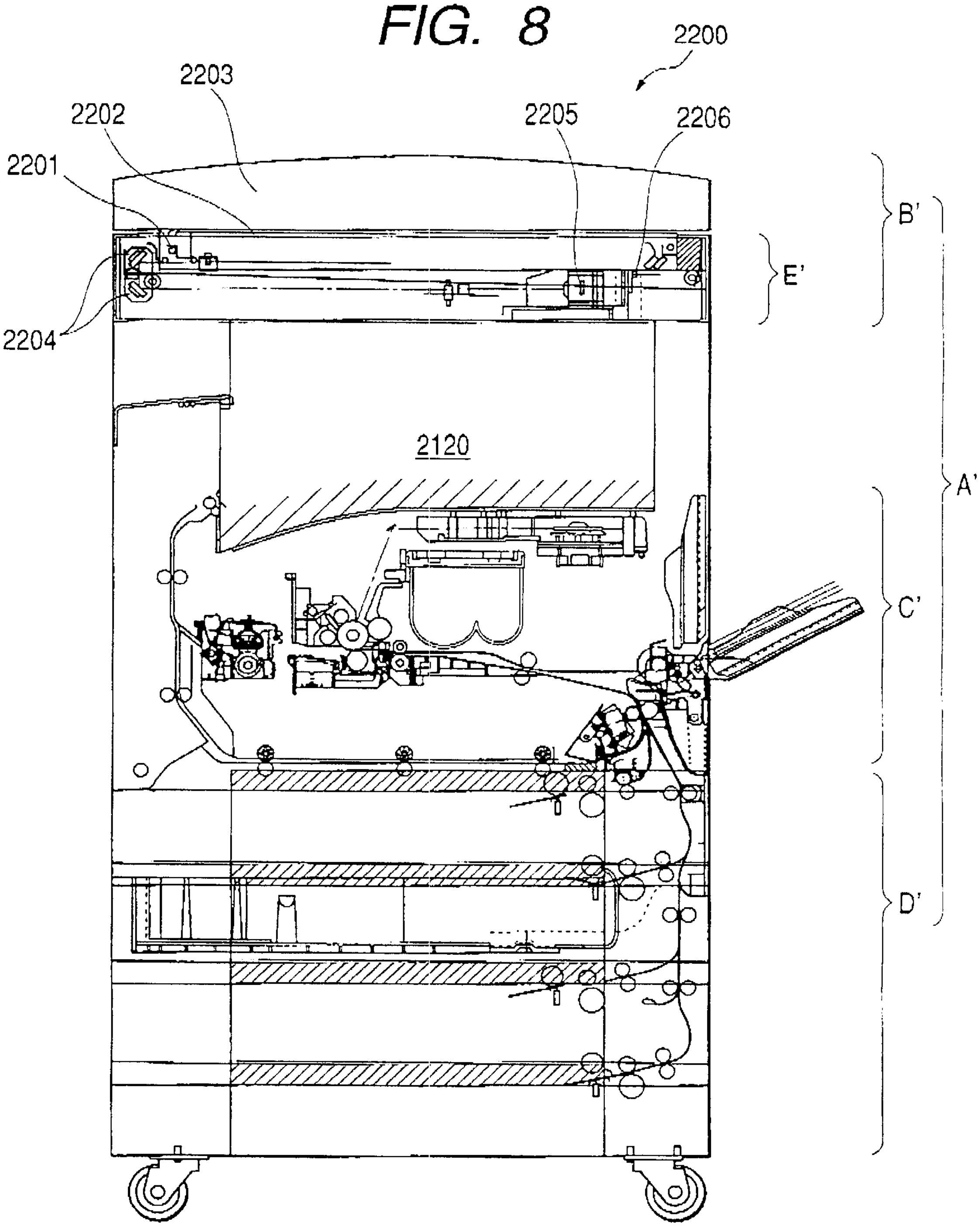
FIG. 8 is a side sectional view schematically showing the internal arrangement of a conventional image forming apparatus.
Figure 9:
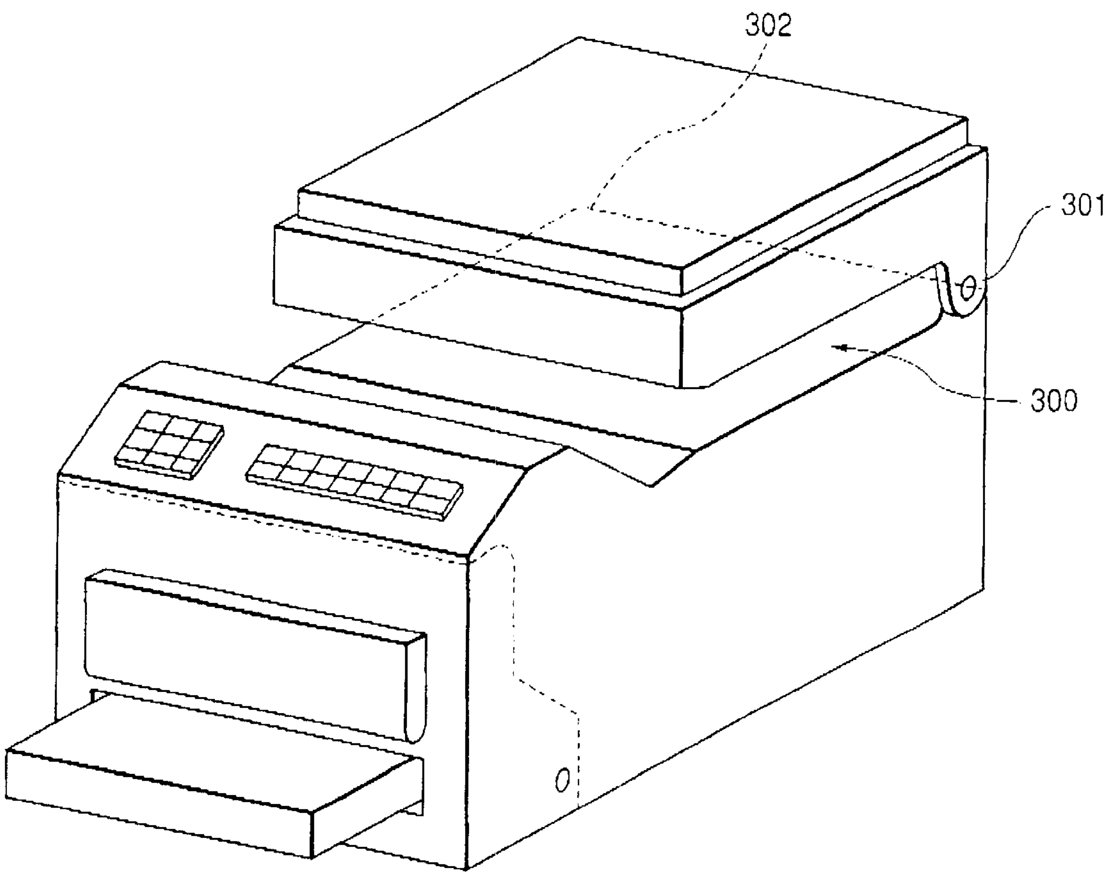
FIG. 9 is a perspective view schematically showing the appearance of a conventional image forming apparatus.
Figure 10:
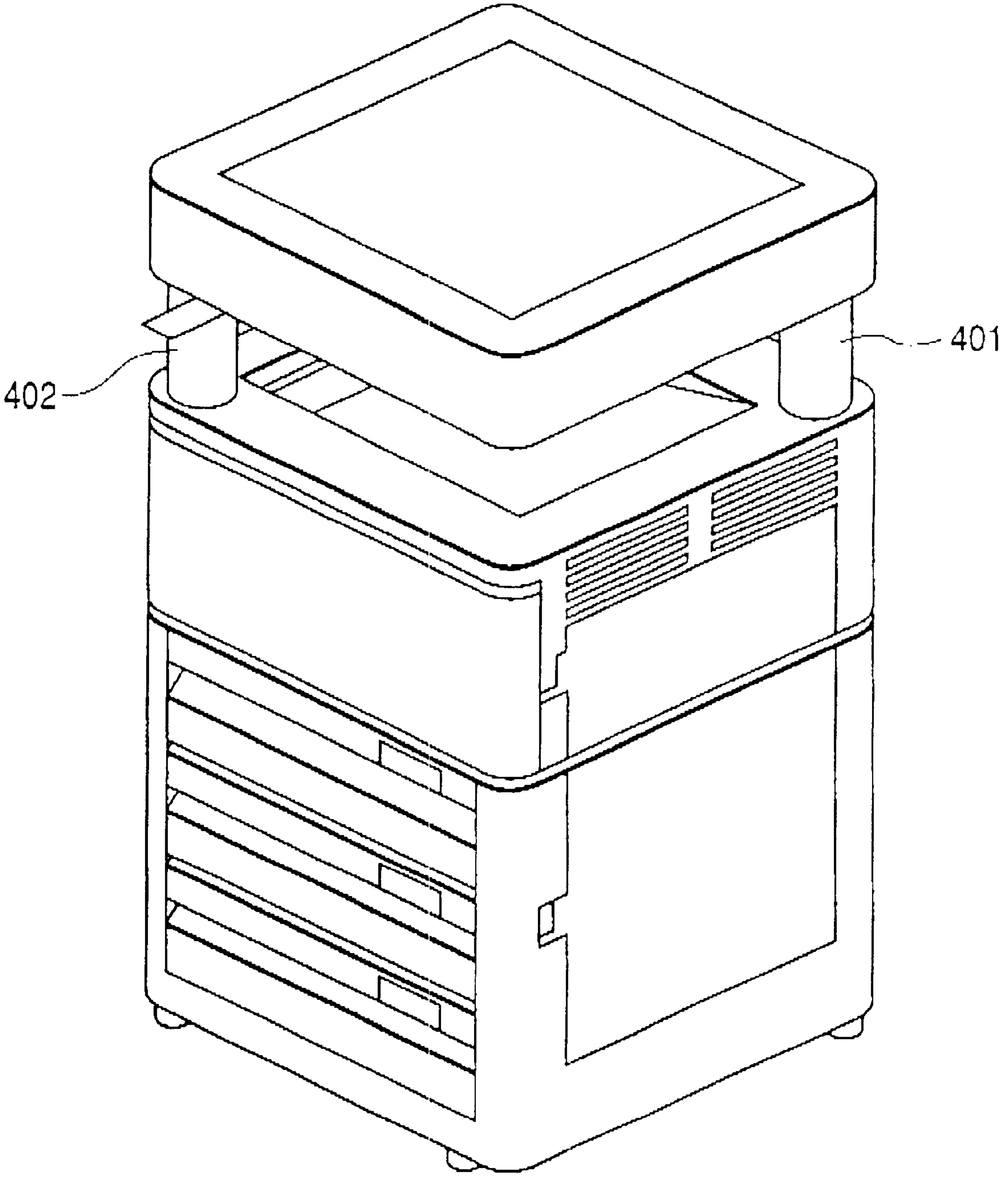
FIG. 10 is a perspective view schematically showing the appearance of another conventional image forming apparatus.
Figure 11:
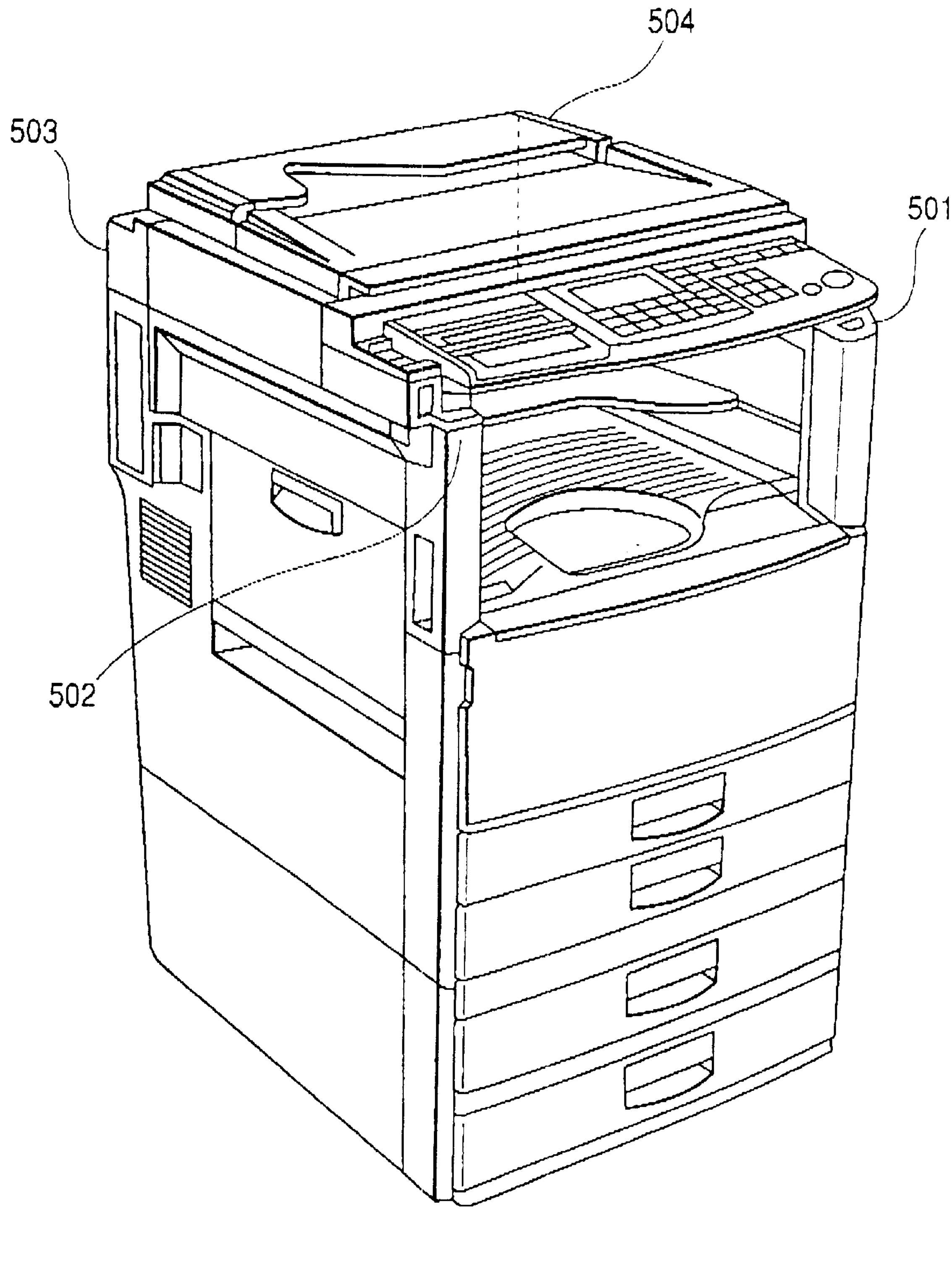
FIG. 11 is a perspective view schematically showing the appearance of still another conventional image forming apparatus.
Figure 12:
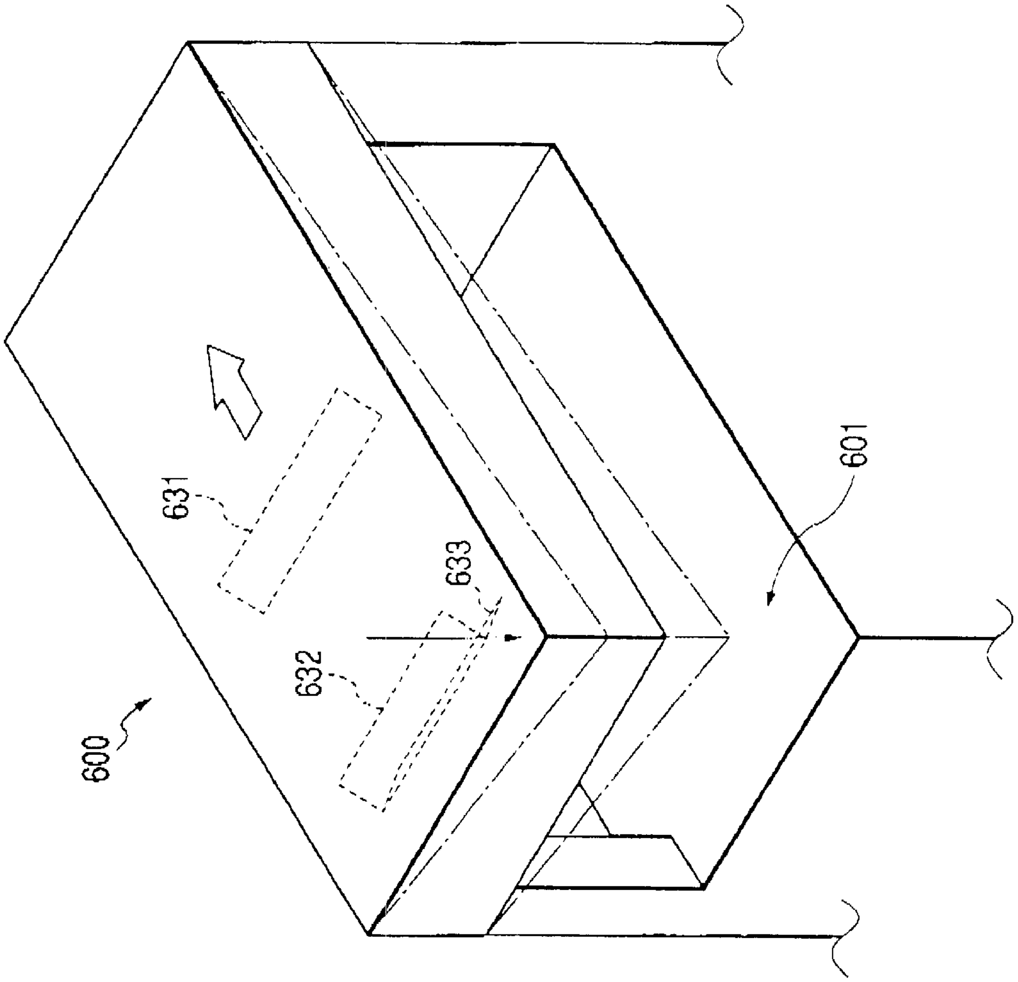
FIG. 12 is a perspective view schematically showing the appearance of yet another conventional image forming apparatus.
Figure 13A:
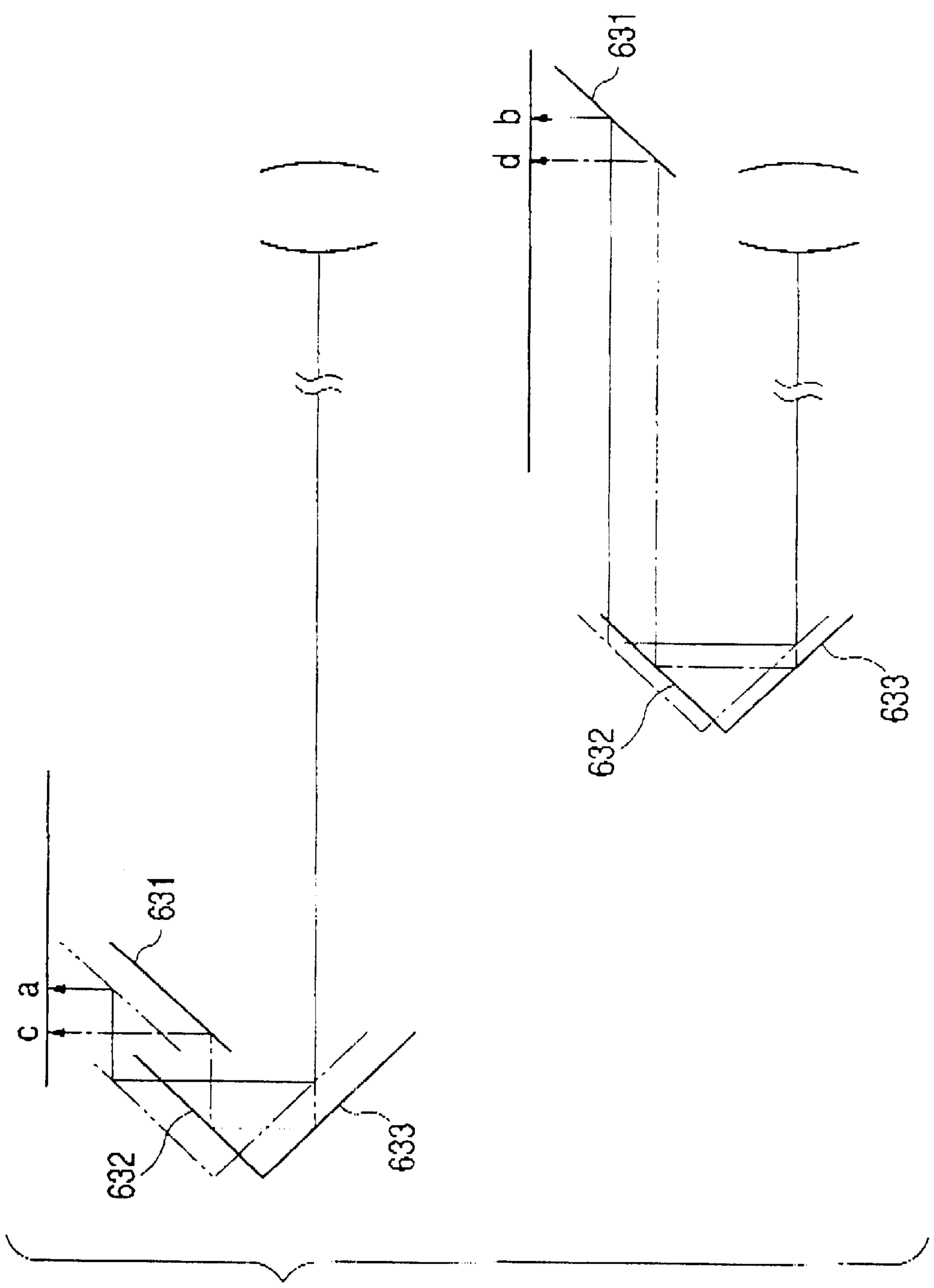
FIGS. 13A and 13B are diagrams illustrating optical paths formed inside a conventional image forming apparatus.
Figure 13B:
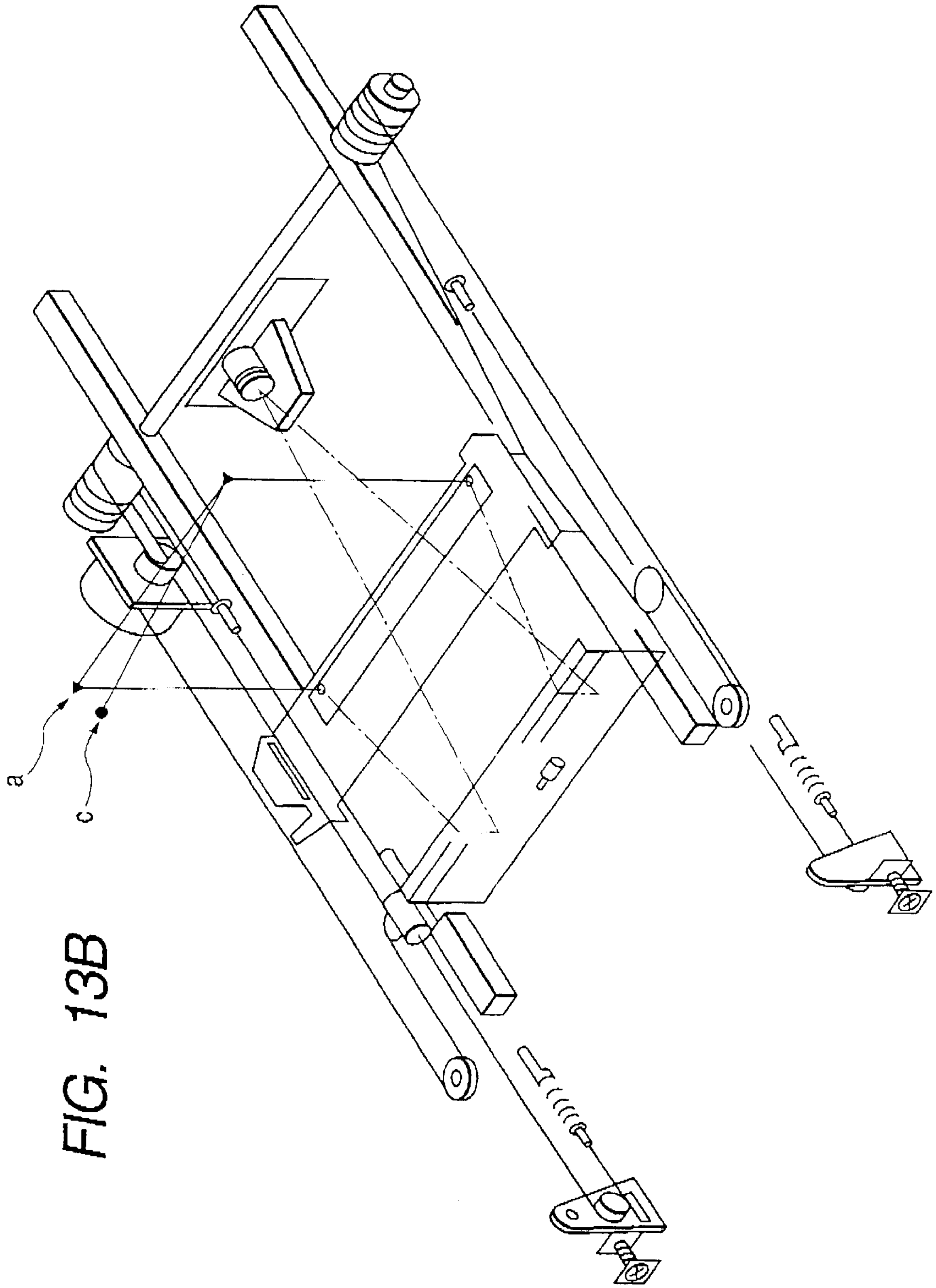

An image forming apparatus according to the second embodiment can be seen as an evolutionary extension of that of the first embodiment. As schematically illustrated in FIG. 7, when the frame is plastically deformed by the application of higher pressure, β portion provided inside the printer strikes a portion (stopper) provided in the image reading portion. On the other hand, when an operator removes sheets delivered in the body, an urging means, not shown, returns the image reading portion to a predetermined position. The provision of such a stopper can control the deformation of the image reading portion caused by the application of pressure from above the apparatus to such an extent that the image reading portion can be elastically recovered.

Further, the deflection preventing means preferably includes an operation permitting means for making the frame structure elastic against pressure in the direction of its own weight to permit the optical systems to operate in the pressed direction, and an operation stopping means for stopping the operation of the optical systems as soon as the amount of operation in the pressed direction reaches a predetermined range.

As shown in FIG. 1, for example, a sensor S100 detects an amount of deflection of the image reading portion B. When the amount of deflection exceeds a predetermined amount, a CPU 1000 as the operation stopping means stops the operation of the mirror 204.

As described above, the present invention can display the following effects:

(1) Laser beams can follow the same optical paths even when the scanner frame is distorted by the application of one-point pressure, which makes it possible to keep proper printing accuracy.

(2) The in-body delivery frame can be of simple structure without the need for great rigidity.

(3) Because of its simple structure, the frame can achieve the lightweight to make the image forming apparatus easy to transport.

(4) The simple structure can also make the frame cost low.

(5) The provision of the stopper feature can prevent plastic deformation.

(6) Sheet removal operations can be improved.

It should be noted that the size, material, shape and position of each part relative to another are not limited to those described in the above-mentioned embodiments unless specifically directed.

What is claimed is:

1. An image reading apparatus comprising:

an original placement portion, on which an original is to be placed;

original scanning means, which moves from a scanning start position in a scanning direction along said original placement portion, for reading an image of an original placed on said original placement portion; and supporting means for supporting said image reading apparatus, wherein an area of a region in which said image reading apparatus is supported on a side of the scanning start position in the scanning direction is larger than an area of a region in which said image reading apparatus is supported on a side opposite the side of the scanning start position.

2. An image reading apparatus according to claim 1, wherein said original scanning means comprises:

a first scanning optical system movable along said original placement portion; and a second scanning optical system movable at a speed lower than a speed of said first scanning optical system to as to guide light from said first scanning optical system to a light receiving portion.

3. An image reading apparatus according to claim 2, wherein said second scanning optical system moves at substantially half the speed of said first scanning optical system.

4. An image reading apparatus according to claim 1, wherein said image reading apparatus is supported on the side of the scanning start position at opposing ends thereof in a direction perpendicular to the scanning direction, and said image reading apparatus is supported on the opposite side at one end thereof in the direction perpendicular to the scanning direction.

5. An image reading apparatus comprising:

an original placement portion, on which an original is to be placed;

original scanning means, which moves from a scanning start position in a scanning direction along said original placement portion, for reading an image of an original placed on said original placement position; and supporting means for supporting said image reading apparatus, wherein a mechanical strength of a supporting region of said supporting means is higher on a side of the scanning start position in the scanning direction than a mechanical strength of a supporting region of said supporting means on a side opposite the side of the scanning start position in the scanning direction.

6. An image reading apparatus according to claim 5, wherein said original scanning means comprises:

a first scanning optical system movable along said original placement portion; and a second scanning optical system movable at a speed lower than a speed of said first scanning optical system so as to guide light from said first scanning optical system to a light receiving portion.

7. An image reading apparatus according to claim 6, wherein said second scanning optical system moves at substantially half the speed of said first scanning optical system.

8. An image reading apparatus according to claim 5, wherein an area of the supporting region on the side of the scanning start position is larger than an area of the supporting region on the side opposite the scanning start position.

9. An image reading apparatus according to claim 5, wherein said image reading apparatus is supported on the side of the scanning start position at opposed ends thereof in a direction perpendicular to the scanning direction, and said image reading apparatus is supported on the opposite side at one end thereof in the direction perpendicular to the scanning direction.

10. An image forming apparatus comprising:

image reading means for reading an image on an original, said image reading means having an original placement portion, on which the original is to be placed, and original scanning means, which moves from a scanning start position in a scanning direction along said original placement portion;

supporting means for supporting said image reading means;

image forming means for forming an image on a recording sheet in accordance with image information read by said image reading means; and a delivery portion, onto which the recording sheet having the image formed by said image forming means is delivered, said delivery portion being disposed between said image reading means and said image forming means, wherein an area of a region in which said image reading means is supported on a side of the scanning start position in the scanning direction is larger than an area of a region in which said image reading means is supported on a side opposite the side of the scanning start position.

11. An image forming apparatus according to claim 10, wherein said original scanning means comprises:

a first scanning optical system movable along said original placement portion; and a second scanning optical system for movable at a speed lower than a speed of said first scanning optical system so as to guide light from said first scanning optical system to a light receiving portion.

12. An image forming apparatus according to claim 11, wherein said second scanning optical system moves at substantially half the speed of said first scanning optical system.

13. An image forming apparatus according to claim 10, wherein said image reading means is supported on the side of the scanning start position at opposed ends thereof in a direction perpendicular to the scanning direction, and said image reading means is supported on the opposite side at one end thereof in the direction perpendicular to the scanning direction.

14. An image forming apparatus according to claim 10, further comprising deflection preventing means for preventing a deflection of said image reading means.

15. An image forming apparatus according to claim 10, further comprising operation stopping means for stopping an image reading operation of said image reading means when an amount of deflection of said image reading means is within a predetermined range.

16. An image forming apparatus comprising:

image reading means for reading an image of an original, said image reading means having an original placement portion, on which the original is to be placed, and original scanning means which moves from a scanning start position in a scanning direction along said original placement portion, supporting means for supporting said image reading means, image forming means for forming an image on a recording sheet in accordance with image information read by said image reading means; and a delivery portion, onto which the recording sheet having the image formed by said image forming means is delivered, said delivery portion being disposed between said image reading means and said image forming means, wherein a mechanical strength of a supporting region of said supporting means is higher on a side of a scanning start position in the scanning direction than a mechanical strength of a supporting region of said supporting means on a side opposite the side of the scanning start position in the scanning direction.

17. An image forming apparatus according to claim 16, wherein said original scanning means comprises:

a first scanning optical system movable along said original placement portion; and a second scanning optical system movable at a speed lower than a speed of said first scanning optical system so as to guide light from said first scanning optical system to a light receiving portion.

18. An image forming apparatus according to claim 17, wherein said second scanning optical system moves at substantially half the speed of said first scanning optical system.

19. An image forming apparatus according to claim 16, wherein an area of the supporting region on the side of the scanning start position is larger than an area of the supporting region on the side opposite the scanning start position.

20. An image forming apparatus according to claim 16, wherein said image reading means is supported on the side of the scanning start position at opposing ends thereof in a direction perpendicular to the scanning direction, and said image reading means is supported on the opposite side at one end thereof in the direction perpendicular to the scanning direction.

21. An image forming apparatus according to claim 16, further comprising deflection preventing means for preventing a deflection of said image reading means.

22. An image forming apparatus according to claim 16, further comprising operation stopping means for stopping an image reading operation of said image reading means when an amount of deflection of said image reading means is within a predetermined range.

* * * * *

UNITED STATES PATENT AND TRADEMARK OFFICE
CERTIFICATE OF CORRECTION

PATENT NO. : 6,728,511 B2
DATED : April 27, 2004
INVENTOR(S) : Yoshiaki Watanabe It is certified that error appears in the above-identified patent and that said Letters Patent is hereby corrected as shown below:

<u>Column 8,</u>
Line 64, "for" should be deleted.

Signed and Sealed this

Twenty-eighth Day of December, 2004

JON W. DUDAS
*Director of the United States Patent and Trademark Office*